United States Patent Office 2,767,147
Patented Oct. 16, 1956

2,767,147

METHOD FOR PREPARING A PLATINUM CONTAINING REFORMING CATALYST

Julius P. Bilisoly, Joseph A. Polack, and Marnell A. Segura, Baton Rouge, La., assignors to Esso Research and Engineering Company, a corporation of Delaware No Drawing. Application March 29, 1951,
Serial No. 218,271

2 Claims. (Cl. 252—442)

This invention relates to the preparation of catalysts, and more particularly to an inexpensive method for the preparation of catalysts containing small amounts of platinum or palladium metal as an active constituent thereof for use in the catalytic conversion of hydrocarbons.

The catalytic metals with which the present invention is concerned are well known to have a pronounced effect on splitting the carbon-hydrogen and carbon-carbon bonds of hydrocarbon molecules at elevated temperatures. This property of these materials is particularly useful in transforming hydrocarbons into other hydrocarbons having definite properties which are more desirable for some specific use. As an example of such a conversion process platinum-containing catalysts have been described in the literature and used to some extent commercially for the reforming of naphthas.

The present invention is concerned with a simplified method for the preparation of a catalyst containing platinum, palladium, or the like which is particularly adapted for use in processes for catalytic naphtha reforming. Such processes may include catalytic aromatization, cyclization, dehydrogenation, isomerization, alkylation, hydroforming and the like, and various combinations between them.

One object of this invention is to prepare a platinum or palladium containing catalyst by a rapid method which saves most of the total time involved in previous methods for the preparation of such catalysts. Another object is to prepare such a catalyst by a one step process eliminating successive treating or handling steps, and the transfer of partially compounded material from one treating stage to another. Still another object is to prepare such a catalyst using cheap and readily available raw materials.

In another embodiment the object of the present invention is to prepare a platinum or noble metal catalyst which will withstand long periods of use in naphtha reforming, without loss in catalyst activity or marked change in the type of action which the catalyst promotes in the naphtha reforming process.

The term "reforming" refers broadly to the conversion of hydrocarbons of one type into hydrocarbons of another type, where the bulk of the product boils in approximately the same boiling range as the feed stock. As applied to naphtha feeds, the most common improvement in properties desired in such treatment is an improvement in motor fuel properties such as volatility and anti-knock or octane number. Under other circumstances, however, an improvement in oxidation stability or in the content of specific hydrocarbons such as isoparaffins, isoolefins, aromatics or other specific compounds may be desired.

The reforming process with which this invention is particularly concerned is the process known as hydroforming, which converts a naphtha feed stock into a naphtha product of improved anti-knock properties. This is an operation carried out in the presence of a solid catalyst and in an atmosphere containing free hydrogen but without a net consumption of hydrogen. In hydroforming operations, hydrogen is evolved by the transformation of other hydrocarbons including naphthenes into aromatics. A certain amount of hydrogenation may take place if the feed stock to the hydroforming step contains olefinic material, and a small amount of hydrogen may be consumed in the hydrogenation of molecular fragments derived from feed molecules by the removal of alkyl groups therefrom. This latter operation which is a type of hydrocracking, should be minimized, however, where it involves the formation of gaseous hydrocarbons of much lower molecular weight from the alkyl groups concerned. It is much preferable to retain these alkyl groups in the product, particularly where this results in the formation of isomeric compounds such as isoparaffins which have a higher anti-knock value than the less highly branched parent hydrocarbons from which they may be derived. In addition to isomerization, dehydrogenation, and aromatization reactions, the hydroforming operation may also involve a certain amount of other reactions such as cyclization, transforming paraffinic constituents of the feed stock into ring compounds such as substituted cyclopentanes and cyclohexanes, which may then be further transformed into aromatics.

The naphtha feed stock to be treated by this reforming process can be derived from a wide variety of sources. It is most commonly a hydrocarbon stream derived at least in part directly from petroleum, in the form of straight run or virgin naphtha. It may also contain secondary products derived from petroleum such as naphthas produced by thermal cracking or catalytic cracking processes. It may also contain any of a variety of synthetic naphthas which may be produced from hydrocarbon or carbonaceous raw materials by such processes as direct gasification, the catalytic reduction of carbon monoxide, and other thermal or catalytic reactions. The term naphtha will be understood to include both light naphthas and heavy naphthas from any of these sources, including hydrocarbons and a certain amount of hydrocarbon derivatives, within the boiling range from approximately 0–450° F.

Catalysts prepared according to the present invention may be applied to reforming broad fractions within the naphtha boiling range for the preparation of fuels such as aviation gasoline, or to narrow boiling fractions for the preparation of specific compounds such as benzene or toluene. Particularly when reforming light naphthas or low boiling cuts in the light naphtha boiling range up to about 200 or 250° F., it may be desirable to keep hydrocracking to the absolute minimum if satisfactory yields of reformed naphtha product are to be realized. For other purposes, and especially where heavy naphthas are being treated, a certain amount of hydrocracking may be desired. Thus, for example, a naphtha fraction in the boiling range from 350–450° F. may contain a significant proportion of paraffinic and naphthenic constituents in the $C_{12}$–$C_{15}$ molecular weight range. Such hydrocarbons can advantageously be decomposed into two or more molecules and still give a product consisting essentially of hydrocarbons in the $C_4$ to $C_8$ range, boiling from about 0–250° F., which will be available as useful fuel constituents in the reformed naphtha produced. In any case, the amount of such hydrocracking which is to be obtained should ordinarily be controlled to keep the major amount of the product in the light naphtha range.

The economics of the catalytic reforming process are dictated to a major extent by the cost of the catalyst. The chief items determining this cost are catalyst life for the specific type of process concerned, the time and labor involved in the preparation of the catalyst and the cost of the raw materials required therefor. For a given composition, catalyst activity and catalyst life may be markedly affected by the method of preparation employed. According to the present invention, catalysts of very good activity and stability are prepared by a simplified method involving a single stage treatment of the raw materials which eliminates most of the time and much of the special equipment necessary for previously recommended methods of preparing platinum-containing catalysts. The noble metals, such as platinum or palladium, which are an essential element of the catalysts prepared according to our invention, are themselves very expensive and a major item in the first costs of these catalysts. In the use of such metals, however, it is common practice to recover the noble metal by a chemical process. Such a reworking, which may be required only after a period of some months in use, reduces the importance of the first cost of the raw material required, and emphasizes the cost of the method of preparing the catalyst. It is this cost of catalyst preparation to which this invention is chiefly addressed.

As carriers for the preparation of this catalyst various adsorptive materials in the form of hydrated metal oxides containing alumina, silica, or various combinations between them as major constituents are found to be particularly useful. Alumina alone or silica alone may be best in some cases where cracking reactions are to be kept to the very minimum. In other cases one of these oxides may be used as the catalyst carrier with a few percent of the other or another suitable metal oxide incorporated either as a part of the base or as an added constituent. Combinations of this type may be useful to give a controlled amount of cracking activity to the catalyst prepared.

A particularly useful catalyst carrier may be one of the commercial grades of alumina that has been activated. Such alumina is derived from various sources, one source being as a by-product in the manufacture of pure aluminum oxide or hydroxide as an intermediate step in the preparation of metallic aluminum from bauxite or other aluminum-containing ores. Various grades of commercial alumina that has been activated are available which differ from one another in the amount of minor constituents such as silica or titania which may be present, the amount of trace impurities such as iron remaining from the refining process, and in physical state or degree of hydration. This permits some choice of the chemical constituents which may be introduced into a catalyst by using various grades of this material. We find some advantage upon occasion in using either relatively pure alumina that has been activated or alumina containing a few percent of silica or titania as may be desired.

For use as a catalyst support in the preparation of this catalyst the alumina to be employed, besides being activated may also be treated with hydrogen fluoride to give a controlled degree of cracking activity. In spite of specific statements to the contrary in the patent literature, however, we find that a catalyst of especially good quality can be prepared by adding this fluoride at the same time that the platinum-containing solution is introduced to lay down the platinum-containing deposit upon the surface of the catalyst support.

In a preferred embodiment of our invention, a previously dried and calcined alumina that has been activated is simultaneously treated with a fluoriding agent such as hydrogen fluoride in an aqueous solution containing a dissolved platinum salt and sulfided by introducing gaseous hydrogen sulfide into the wet mixture. The use of commercial alumina that has been activated as the catalyst support avoids the exceedingly tedious and time-consuming process of washing to remove soluble salts which is involved in the preparation of catalysts based upon alumina gel derived from the hydrolysis of alumina salts, as previously recommended elsewhere. According to our invention the alumina to be employed is preferably one which has been previously dried and activated. This material, in the form of small granules of suitable particle size, is treated with a mixed water solution of HF and a soluble platinum compound, then treated with a precipitating agent to cause the deposition of platinum or a platinum compound on the surface of the alumina. When the precipitating agent used is hydrogen sulfide, it is believed that this acts partly to reduce the platinum to a colloidal metallic deposit which may also contain colloidal platinum sulfide. Other precipitating agents may be employed, such as ammonium sulfide, or it may be preferred in some cases to dry and calcine the resultant suspension without using any precipitating agent. In any case, the wet suspension is first dried, then calcined for a suitable period at a temperature in the range of 800 to 1200° F. and finally reduced with hydrogen to convert any residual oxide, sulfide or other reducible platinum compound to metallic platinum before the catalyst is ready for use.

EXAMPLE I 350 grams of commercial H–41 grade Alorco alumina (Aluminum Company of America), previously pulverized 100% through 35 mesh, dried at 270° F. and calcined one hour at 900° F. was stirred in a porcelain container with 375 cc. of aqueous solution containing 17.3 grams of 10.1% HF solution and 46.4 grams of 10% chloroplatinic acid $H_2PtCl_6 \cdot 6H_2O$. Into this slightly fluid mixture $H_2S$ was introduced through a tube for a period of one hour with suitable mixing by mechanical agitation. The sulfided mass was dried under forced draft for 16 hours at 250° F., pilled and then calcined two hours at 950° F. Upon charging to a testing unit, the catalyst was reduced with hydrogen while raising the temperature to 900° F. and reduced further at 900° F. for about six hours prior to its use in naphtha reforming.

EXAMPLE II 12,100 grams (26.7 lb.) of commercial H–41 grade Alorco alumina, previously pulverized 100% through 35 mesh, dried at 270° F. and calcined one hour at 900° F. as above to a volatile content at 1600° F. of 6.2% (equivalent to approximately 11,350 g. or 25 lb. of bone dry alumina), was placed in a Simpson mixer provided with a hood and fan-operated vent. 1505 grams of a 10% $H_2PtCl_6 \cdot 6H_2O$ solution plus 560 grams of a 10.1% aqueous HF solution were mixed and diluted to 11,800 grams (26 lb.) with distilled water. This solution was added to the dry catalyst in the mixer and mixing was continued for 15 minutes after which a material of fairly fluid consistency resulted. Hydrogen sulfide was then introduced through a tube into the mass, while continuing to mix for one hour. The material was then removed and dried under forced draft for 16 hours at 250° F. This particular batch of catalyst after crushing lightly to break up lumps had the following particle size range as determined in the Roller particle size analyzer:

| Microns: | Percent |
|---|---|
| 0–20 | 28 |
| 20–40 | 18 |
| 40–80 | 20 |
| 80+ | 34 |

Portions of the batch were pilled and activated two hours at 900–950° F. for test purposes.

The platinum content was 0.53% and the volatile content 3% (on the 950° F. activated material).

The choice of operating conditions under which these catalysts are used gives some degree of control over the particular reactions which predominate. The degree of control which this permits is not as complete as might be desired, however. Thus in the use of these platinum catalysts or their palladium analogues for the hydroforming of naphthas, experience has shown that the highest octane number product is obtained by operating at relatively low pressures of the order of 100–300 lbs. per sq. in. The high octane number of the product thus obtained is due partly to the fact that under these conditions the paraffinic constituents of the naphtha are converted almost wholly to isoparaffins. At the same time, however, the platinum catalyst under these conditions becomes more rapidly fouled with a carbonaceous deposit caused by the degradation of some of the constituents of the feed stock into coke, than it does when operating at a higher reforming pressure in the range of 500 to 1000 lbs. per sq. in. The advantage of the so-called low pressure operation is that the improved octane number of the product obtained under low pressure more than compensates for the disadvantage which this coke production entails.

The improved catalysts prepared by the specific method described in detail above may be employed in hydroforming operations at pressures between atmospheric and about 1000 lbs. per sq. in. They are particularly effective at the lower pressures in the range up to about 300 p. s. i. The temperature employed may be between about 600 and 1000° F., preferably between 800 and 950° F. The hydrogen-containing gas introduced into the reaction zone may be recovered from the product together with hydrogen produced, and recycled at the rate of about 100 to 12,000 cu. ft., preferably 500 to 3000 cu. ft. per barrel of naphtha feed. This recycle gas in the hydroforming process contains about 80 to 99 mol. percent hydrogen. The portion of the product gas recycled may be an aliquot of the total gas recovered or it may be treated in some suitable manner to remove water, heavier hydrocarbons or other constituents and give as pure a hydrogen recycle stream as may be desired. The naphtha feed rate may be a weight space velocity of 0.25 to 5 w./hr./w. (weight of oil per hr. per unit weight of catalyst in the reaction space), preferably 0.5 to 2 w./hr./w. In general higher naphtha feed rates produce essentially the same yield of gasoline, but the gain in octane number and volatility as compared to the feed stock are reduced appreciably thereby.

The carbonaceous deposit or coke which may be laid down upon the catalyst as a result of operating under the conditions noted above can be removed in various ways. Its deposition is markedly inhibited by the hydrogen present in the hydroforming process. We have also found that in our preferred low pressure reforming process using these new catalysts, any such coke deposits can be more or less completely removed by hydrogen treatment in the absence of the feed stock. Such a hydrogen treatment may be carried out at substantially operating conditions of temperature and pressure, or it may be carried out under higher temperature or higher hydrogen partial pressure conditions.

In other cases, it is found that hydrogen treatment alone is not sufficient to keep the catalyst satisfactorily free of coke, and a more intensive regeneration procedure is required.

Such a treatment commonly involves the combustion of the coke deposit in a stream of air or other oxygen-containing gas. Various expedients are well known in the art for tempering such a regeneration gas stream, to control the speed, temperature level and completeness of coke removal. Any such oxidative regeneration process, however, converts the catalytic metal of these catalysts at least partly to the metal oxide. The regenerated catalyst oxidized in this way must be reduced again to the metal form, before proceeding with the hydroforming process. This alternating cycle of oxidation and reduction of the metallic constituents has been found to be particularly responsible for promoting the growth of the highly active and highly dispersed catalytic metal particles of platinum-containing catalysts into the crystalline relatively inactive form. We prefer to carry out catalyst regeneration by hydrogen treatment alone. To this end, we also prefer to limit the catalyst time on stream so as to give a type of coke which can be most readily removed by such hydrogen treatment.

Catalysts of about the same molecular composition as those described above can be made by other methods. However, as will be seen by the following example, catalysts prepared according to the method of the present invention possess an activity which is the full equivalent or superior to that of catalysts prepared by more tedious or more expensive methods of preparation.

EXAMPLE III

The reforming activity of the catalysts described above was tested under hydroforming conditions feeding a 200 to 330° F. heavy naphtha having a clear octane number of about 40 by the CFR Research method. This naphtha was treated in ten cycles of three hours each on stream, at 200 lbs. per sq. in. pressure, 900° F., and a weight space velocity of 1 w./hr./w., feeding a hydrogen-containing gas at a rate equivalent to 6000 cu. ft. per barrel of naphtha feed, or a rate of 1200 volumes of gas per volume of catalyst per hour (v./v./hr.). Following each three hour period on stream the catalyst was regenerated with the hydrogen-containing gas at the same temperature and pressure for six hours with a gas rate of 2400 v./v./hr.

The data obtained under these conditions of operation are summarized in Table 1, for the catalysts prepared according to Example I and Example II. For comparison, similar data are also shown for results obtained in parallel tests using another platinum-containing catalyst (III in Table 1) prepared on an alumina precipitated from aluminum chloride. This latter catalyst was prepared by commingling a solution of aluminum chloride hexa-hydrate with diluted ammonium hydroxide, the final pH being adjusted to 10. The precipitated alumina was thoroughly washed to remove excess chloride ions, reslurrying three successive times in large amounts of diluted ammonium hydroxide adjusted to a pH of 10. The washed filter cake was then commingled with dilute aqueous hydrogen fluoride, in an amount corresponding to 2% HF by weight based on the alumina content. A separate platinum-containing slurry was prepared by bubbling $H_2S$ through a diluted chloroplatinic acid solution until no further change occurred, and this slurry was mixed with the HF treated alumina. The resultant composite was dried at 250° F., further heated and calcined for three hours at 950° F., and pilled.

Table 1

| Catalyst No. | I (1 lb. lot) H-41, +0.5% HF 0.5% Pt | | | II (25 lb. lot) H-41, +0.5% HF 0.5% Pt | | | III (precipitated) by hydrolysis of AlCl₃ 2% HF, 0.5% Pt | | |
|---|---|---|---|---|---|---|---|---|---|
| Alumina base | | | | | | | | | |
| Wt. percent on alumina | | | | | | | | | |
| | Aniline Pt., °F. | Gr. °API | Clear O.N. CFR Res.[1] | Aniline Pt., °F. | Gr. °API | Clear O.N. CFR Res.[1] | Aniline Pt., °F. | Gr. °API | Clear O.N. CFR Res.[1] |
| Cycle No.: | | | | | | | | | |
| 1 | 8 | 44.3 | [2]96 | 10 | 44.7 | [2]96 | 54 | 52.9 | 90 |
| 2 | 9 | 44.0 | [2]96 | 5 | 44.3 | [2]97 | 59 | 52.8 | 88 |
| 3 | 13 | | [2]95 | 1 | 43.9 | [2]98 | 73 | 53.9 | [2]81 |
| 4 | 14 | | 95 | 1 | 44.0 | 98 | 82 | 55.5 | [2]77 |
| 5 | 10 | 44.4 | 96 | 5 | 44.1 | 97 | 84 | 56.1 | [2]75 |
| 6 | 18 | 44.5 | 94 | 18 | 45.3 | 95 | 89 | 56.0 | 70 |
| 7 | 27 | 45.3 | 92 | .3 | 43.1 | [2]97 | 88 | 55.6 | [3]70 |
| 8 | 25 | 45.4 | 92 | 10 | 44.3 | [2]96 | 93 | 56.1 | 70 |
| 9 | 25 | 45.4 | 92 | 19 | 45.0 | [2]94 | 97 | 55.8 | 70 |
| 10 | 28 | 45.8 | 92 | 10 | 44.0 | 96 | | | |
| Yield Data and Product Quality: | | | | | | | | | |
| C₅+ Basis— | | | | | | | | | |
| Vol. percent on Feed | | 87.1 | | | 80.3 | | | 79.4 | |
| O.N.-CFRR clear | | 96.2 | | | 97.7 | | | 75.6 | |
| R.V.P. | | 4.2 | | | 2.4 | | | 3.8 | |
| 10 lb. R.V.P. Basis— | | | | | | | | | |
| Vol. Percent on Feed | | 96.9 | | | 92.7 | | | 89.1 | |
| O.N.-CFRR clear | | 96.8 | | | 97.4 | | | 78.0 | |

[1] Individual cycle quality estimated from correlations of hydroformate gravity, aniline pt. and O. N.
[2] Product cycles blended for O. N. determinations.
[3] Extra 33 hour H₂ regeneration between cycles 6 and 7 in this run.

It is seen that catalysts prepared according to the method of the present invention permit the preparation of gasolines of exceptionally high octane number in high yields. This is in marked contrast to previously described naphtha reforming processes where products approaching the quality of pure iso-octane cannot be obtained at all, or can be obtained only at the expense of severe losses to gas and coke. The quality of the product naphtha thus determined is maintained quite satisfactorily by hydrogen regeneration according to the regeneration method discussed above in detail. The gravity and R. V. P. of the liquid products also indicate that the naphthas obtained from the catalysts of Example I and Example II are of normal volatility with no evidence of extensive hydrocracking.

The excellence of these catalysts as compared to those prepared by previously proposed techniques is particularly demonstrated by this maintenance of activity through 10 cycles with hydrogen regeneration. Subsequent data indicate that the catalysts of our invention are capable of maintaining substantially the same high level of activity through prolonged periods of use with hydrogen regeneration.

The catalysts of the present invention may be employed in any of a variety of ways for the process of naphtha reforming. These catalysts may be brought into the form of pills, lumps or granules and employed in a fixed bed or moving bed apparatus. They are particularly suited for use in a fluid bed system, wherein the calcined catalyst material during the course of its preparation is brought into a finely divided form such that it will pass substantially all through a 100 mesh screen. For such a fluid bed operation the naphtha vapors and hydrogen-containing gas may be introduced to the reaction zone in the form of an up-flowing gas stream having a velocity within the range of from about 0.05 to 3 feet per second, sufficient to maintain the finely divided catalyst in the form of a dense, turbulent, fluidized suspension.

While the above catalysts have been described without particular reference to the amount of water employed in their preparation, we find definite advantages in using a limited amount of water. This results in a more uniform dispersion of the metallic constituent on the catalyst carrier. In this embodiment of our invention, it is preferable to employ an amount of water in making up the mixed solution of HF and metal salt which is just sufficient to be taken up substantially completely by the dried alumina in the impregnation step. When catalysts are being prepared in this way, mechanical agitation may be used to give a more uniform precipitation on the subsequent addition of a precipitating agent.

Having thus described the invention it is understood that it embraces such other variations and modifications as come within the sphere and scope thereof.

What is claimed is:

1. The method of preparing a platinum-containing catalyst on an alumina base which comprises the steps of treating dried particulate alumina that has been activated with a mixed solution of hydrogen fluoride and a soluble platinum salt and then sulfiding the resulting wet mixture with a stream of hydrogen sulfide to deposit a finely divided platinum-containing dispersion on the surface of the active alumina.

2. The method of preparing a platinum-containing catalyst for naphtha reforming which comprises treating a calcined alumina base that has been activated with a solution containing an amount of hydrogen fluoride sufficient to give the equivalent of about 0.1 to 2% of HF on alumina by weight together with a soluble platinum salt in an amount sufficient to give about 0.01 to 1% of platinum on alumina by weight in an amount of water just sufficient to be taken up substantially completely by the dry alumina, mechanically agitating the resultant wet mixture while adding hydrogen sulfide as a precipitating agent thereto and depositing a precipitated form of platinum as a fine dispersion on the surface of the active alumina, then drying and calcining to remove said added water and reducing the treated material with a stream of heated hydrogen before introducing the naphtha for the reforming steps.

References Cited in the file of this patent

UNITED STATES PATENTS

| 2,479,110 | Haensel | Aug. 16, 1949 |
| 2,623,861 | Haensel | Dec. 30, 1952 |
| 2,667,461 | Guyer et al. | Jan. 26, 1954 |